(12) United States Patent
Cornu et al.

(10) Patent No.: US 9,347,816 B2
(45) Date of Patent: May 24, 2016

(54) TWO PART HOLLOW PROFILE SENSOR

(75) Inventors: David Cornu, Bellinzona (CH); Adrian Hofmann, Ellikon Am Rhein (CH)

(73) Assignee: KISTLER HOLDING AG, Winterthur (CH)

( * ) Notice: Subject to any disclaimer, the term of this patent is extended or adjusted under 35 U.S.C. 154(b) by 160 days.

(21) Appl. No.: 14/350,894

(22) PCT Filed: Jun. 20, 2012

(86) PCT No.: PCT/CH2012/000134
§ 371 (c)(1),
(2), (4) Date: Apr. 10, 2014

(87) PCT Pub. No.: WO2013/056381
PCT Pub. Date: Apr. 25, 2013

(65) Prior Publication Data
US 2014/0251700 A1     Sep. 11, 2014

(30) Foreign Application Priority Data

Oct. 20, 2011    (CH) .................................. 1704/2011

(51) Int. Cl.
| | | |
|---|---|---|
| *G01G 3/13* | (2006.01) | |
| *G01G 19/02* | (2006.01) | |
| *G01G 19/03* | (2006.01) | |
| *G01L 1/16* | (2006.01) | |

(52) U.S. Cl.
CPC ............... *G01G 19/02* (2013.01); *G01G 3/13* (2013.01); *G01G 19/024* (2013.01); *G01L 1/16* (2013.01)

(58) Field of Classification Search
CPC ..... G01G 3/13; G01G 19/007; G01G 19/024; G01G 19/025; G01G 19/027; G01G 19/022; G01G 19/02; G01G 21/28; G01L 1/14; G01L 1/16; G01L 1/04
See application file for complete search history.

(56) References Cited

U.S. PATENT DOCUMENTS

| | | | | |
|---|---|---|---|---|
| 3,575,248 A | * | 4/1971 | Bell ......................... | G01G 3/08 177/163 |
| 3,592,278 A | * | 7/1971 | Shumaker ............ | G01G 23/362 177/163 |
| 4,162,710 A | * | 7/1979 | Sjogren .................. | G01G 19/10 177/141 |

(Continued)

FOREIGN PATENT DOCUMENTS

| | | |
|---|---|---|
| CH | 394637 | 6/1965 |
| CH | 702257 | 5/2011 |

(Continued)

OTHER PUBLICATIONS

International Search Report for PCT/CH2013/000005, issued Feb. 11, 2013.

(Continued)

*Primary Examiner* — Randy W Gibson
(74) *Attorney, Agent, or Firm* — Dority & Manning, P.A.

(57) ABSTRACT

A hollow profile sensor for installation in roads or a road surface for the purpose of sensing the weight of vehicles and/or driving dynamics reactions of vehicles or vehicle wheels to the road includes a tube part having a hollow interior profile. A counterpart is connected to the tube part. A measuring arrangement is held in the hollow interior profile between the tube part and the counterpart. A force introduction flange is connected to the tube part in such a manner that force application lines are concentrated on the measuring arrangement.

20 Claims, 2 Drawing Sheets

(56) References Cited

U.S. PATENT DOCUMENTS

| | | | |
|---|---|---|---|
| 4,361,198 A * | 11/1982 | Sjogren | G01G 19/10 |
| | | | 177/141 |
| 4,597,151 A | 7/1986 | Zaghi et al. | |
| 4,701,660 A * | 10/1987 | Baumgartner | H01L 41/1132 |
| | | | 177/210 R |
| 5,265,481 A | 11/1993 | Sonderegger et al. | |
| 5,345,428 A | 9/1994 | Arnold et al. | |
| 5,461,924 A | 10/1995 | Calderara et al. | |
| 5,501,111 A | 3/1996 | Sonderegger et al. | |
| D370,423 S | 6/1996 | Nagai et al. | |
| D370,424 S | 6/1996 | Nagai et al. | |
| D373,738 S | 9/1996 | Nagai et al. | |
| D386,431 S | 11/1997 | Nagai et al. | |
| D786,702 | 11/1997 | Nagai et al. | |
| 5,717,390 A | 2/1998 | Hasselbring | |
| 5,942,681 A | 8/1999 | Vollenweider et al. | |
| 5,991,676 A * | 11/1999 | Podoloff | G01G 19/4142 |
| | | | 177/144 |
| 6,459,050 B1 | 10/2002 | Muhs et al. | |
| D469,886 S | 2/2003 | Barnett | |
| 6,595,064 B2 | 7/2003 | Drewes et al. | |
| 7,153,383 B2 * | 12/2006 | Gebert | G01G 7/06 |
| | | | 156/249 |
| D550,861 S | 9/2007 | Brabeck et al. | |
| 7,423,225 B1 | 9/2008 | Kroll et al. | |
| D684,075 S | 6/2013 | Cornu | |
| D686,928 S | 7/2013 | Cornu | |
| 2002/0014124 A1 | 2/2002 | Drewes et al. | |
| 2011/0232974 A1 | 9/2011 | Abercrombie et al. | |
| 2014/0345955 A1 * | 11/2014 | Cornu | G01G 3/13 |
| | | | 177/180 |
| 2015/0075297 A1 * | 3/2015 | Cornu | G01G 3/13 |
| | | | 73/862.642 |

FOREIGN PATENT DOCUMENTS

| | | |
|---|---|---|
| EP | 0259523 | 3/1988 |
| EP | 0491655 | 6/1992 |
| EP | 0654654 | 5/1995 |
| EP | 0 892 259 | 1/1999 |
| WO | 01/22044 A1 | 3/2001 |
| WO | 02/08712 | 1/2002 |
| WO | 03/071242 | 8/2003 |

OTHER PUBLICATIONS

International Preliminary Report on patentability for PCT/CH2012/000149, issued Jan. 7, 2014.

International Preliminary Report on Patentability and Written Opinion for PCT/CH2012/000247, dated May 6, 2014.

International Search Report for PCT/CH2012/000251, issued Mar. 13, 2013.

International Search Report, issued Jul. 31, 2012.

J. Boby, S. Teral, J.M. Caussignac and M. Siffert "Vehicle Weighing in Motion with Fibre Optic Sensors", pp. 45-47, Measurement + control, vol. 26, Mar. 1993.

* cited by examiner

TWO PART HOLLOW PROFILE SENSOR

CROSS-REFERENCE TO RELATED APPLICATIONS

This application claims priority to International Application Serial No. PCT/CH2012000134, filed Jun. 20, 2012, which claims priority to Swiss Application No. CH 17042011 filed Oct. 20, 2011. International Application Serial No. PCT/CH2012000134 is hereby incorporated herein for all purposes by this reference.

FIELD OF THE INVENTION

The invention pertains to a hollow profile sensor for the installation into roads or a road surface for the purpose of measuring the weight of vehicles and/or dynamic reactions of vehicles or of vehicle wheels to the road, as well as for measuring vehicle speeds and other quantities to be measured.

BACKGROUND

Sensors and measuring means for measuring and weighing vehicles in motion (weigh in motion—WIM) are generally known. A tubular sensor is already described in EP-A-0491655. FIG. 1 shows a hollow profile sensor according to U.S. Pat. No. 5,461,924, which discloses another hollow profile sensor with a tube section that contains a measuring arrangement in its profile interior, wherein said measuring arrangement is non-positively connected to the wall of the tube section. The tube section features a force introduction flange that is connected to the tube section flanking thereto in such a way that the force application lines are concentrated on the measuring arrangement and a mechanical amplifier effect is achieved. The lines of force P indicated by the arrows in FIG. 1 generate a concentrated force in the hollow profile sensor as indicated by a double arrow that centrally extends through the measuring element illustrated in the center.

In other known embodiments, the force of the wheels of the vehicles driving over the hollow profile sensor is not introduced into the measuring element in a concentrated fashion, but rather extends from the respective location into the ground relatively vertical or partially via lateral supports, wherein only one component of the force respectively extends through the measuring element. Such embodiments proved insufficient with respect to the nowadays required accuracy for the aforementioned applications. In addition, most older applications do not make it possible to measure shearing forces.

In contrast to other known embodiments that feature elastomers between the measuring elements and the force application in order to absorb transverse forces, it proved advantageous with respect to the accuracy if the flow of forces is transmitted from the vehicle to a wide force introduction flange by means of a hard surface, wherein said force introduction flange in turn transmits the forces directly to the measuring element in a concentrated fashion. In this case, no elastic materials at all can be arranged between the vehicle wheel and the measuring element and essentially all lines of force P should extend through the measuring element in order to prevent force shunts.

In the aforementioned arrangement, the sensor consists of a quartz crystal sensor with stable electrical and mechanical properties that is decoupled from lateral forces and has no interfering signal drift.

Although hollow profile sensors of this type function reliably over long periods of time, their manufacture and installation are very elaborate due to the closed one-piece design of the hollow profile. An industrial manufacture, in particular, in large quantities therefore could hardly be realized and would not be economical.

Piezoelectric measuring elements need to be installed in a sensor structure under prestress. In the prior art, the prestress is generated in that the sensor elements are manufactured with a cover and subsequently installed in the hollow profile.

It is impossible to adjust and control the local prestressing force because it is dependent on different factors such as, e.g., the height, flatness and parallelism of the contact surfaces over the entire length of the profile, the height of the measuring arrangement, the cross-sectional geometry, in particular, of the tube section, as well as the modulus of elasticity of the profile material (e.g., aluminum, steel or other alloys). In a closed hollow profile, a uniform prestress over the length thereof can be achieved if the wall thickness is realized in a highly accurate uniform fashion. As the length increases, however, it becomes nearly impossible to process the contact surfaces in the interior, between which the measuring elements are arranged, with uniform accuracy over the entire length of the profile. Even a slight inaccuracy of these geometries already leads to different prestresses in the individual measuring elements and therefore to inaccurate measurement results.

BRIEF SUMMARY OF THE INVENTION

The invention therefore is based on the objective of improving a hollow profile sensor such that the described disadvantages of the prior art are eliminated.

This objective is attained as described more fully below.

Since a divided hollow profile, particularly a two-part hollow profile, is provided, the parts of the hollow profile can be manufactured in a less complex fashion and their respective connecting surfaces or contact surfaces can be mechanically processed with high accuracy over any length. The tolerance requirements with respect to height, flatness and parallelism therefore can be met with less effort. The advantageous arrangement of force introduction flanges known from U.S. Pat. No. 5,461,924, which is hereby incorporated herein in its entirety by this reference for all purposes, is largely maintained.

Preferred embodiments of the hollow profile sensor are disclosed in the dependent claims more fully below. For example, either the tube section itself may be divided or an open tube section is closed by means of a counterpart with a force anchoring flange. The connection of the parts may be produced by means of non-positive, integral bonding or even positive connecting technologies.

The invention is not limited to the explicitly described embodiments.

BRIEF DESCRIPTION OF THE DRAWINGS

Exemplary embodiments of the invention are described in greater detail below with reference to the drawings, wherein reference symbols are always used for the same designations in all figures. In the drawings.

DESCRIPTION OF EXEMPLARY EMBODIMENTS OF THE INVENTION

It is important that the measuring arrangement is installed under prestress. Consequently, the invention only concerns embodiments in which a concentration of the force action lines on the measuring device is realized. They should furthermore be suitable for carrying out shear force measurements by utilizing shear sensors in the measuring arrangement.

Figure 1:
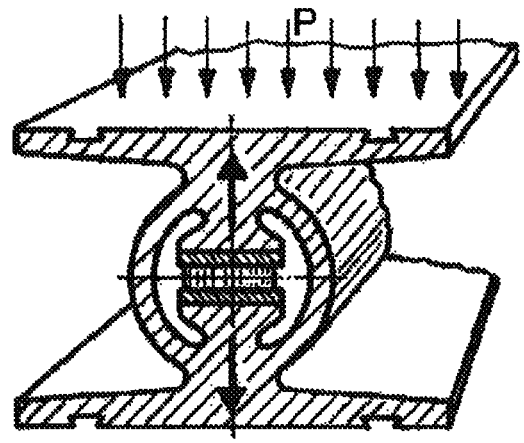
FIG. 1 shows a hollow profile sensor according to U.S. Pat. No. 5,461,924.
Figure 2:
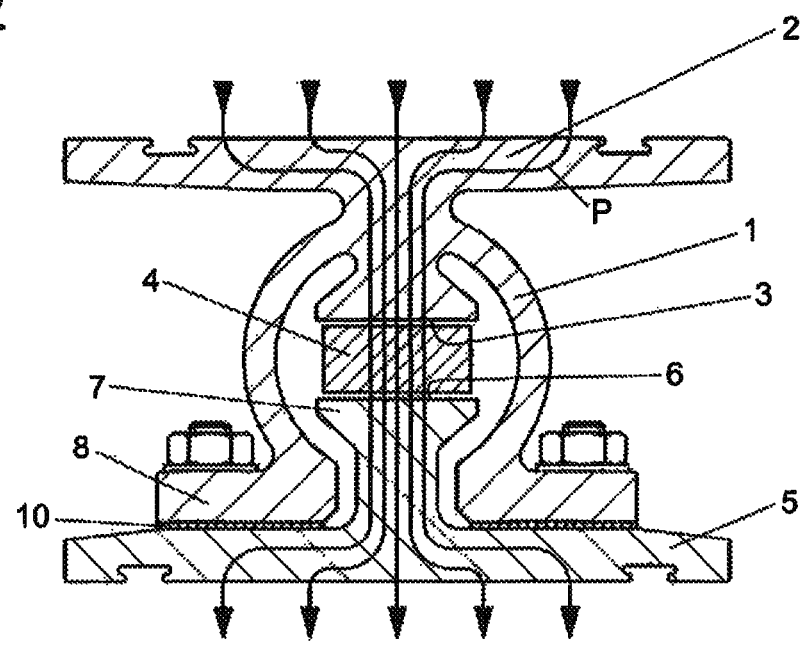
FIG. 2 shows a first embodiment of an inventive hollow profile sensor.

FIG. 2 shows a hollow profile sensor with an open and, e.g., tubular or U-shaped tube section 1 that features a force introduction flange 2 and a mounting 3 for a measuring arrangement 4, as well as a correspondingly shaped counterpart 7 with a force anchoring flange 5 for the installation in the road base and a mounting 6 for the measuring arrangement 4.

The sensor has an elongated design and is therefore more than 10-times as long as it is wide or high because it needs to extend over a significant portion of the road. It typically has a length between 1 and 4 m and a width and a height of less than 10 cm, preferably about 5 cm.

FIG. 2 particularly shows the hollow profile with the tube section 1 and with the measuring arrangement 4 in the profile interior, wherein the tube section 1 features a force introduction flange 2 that is connected to the tube section in such a way that a concentration of force application lines P on the measuring arrangement 4 is realized. The tube section 1 is assigned to the counterpart 7.

The hollow profile may, in particular, have an essentially round shape, but this is by no means imperative. If designed accordingly, U-shaped, oval or even essentially rectangular and other cross-sectional shapes of the tube profile may deliver equally good results. It is decisive that each force application line P is vertically routed through the measuring arrangement 4 regardless of the exact location, at which the force is applied to the force introduction flange 2, namely without thusly generating transverse forces on the measuring arrangement 4. On the other hand, if transverse forces are applied to the force introduction flange 2, they should likewise occur as transverse forces on the measuring arrangement 4.

According to the invention, the hollow profile is realized in the form of a two-part hollow profile that is divided into the two profile parts tube section 1 and counterpart 7. In addition, the profile parts 1, 7 are connected to one another in connecting regions in such a way that the prestressing force is evened out over the length of the hollow profile sensor by adjusting the tension of the profile parts 1, 7 relative to one another.

This two-part design of the hollow profile on the one hand makes it possible to simplify the processing of the mountings 3, 6 with the required accuracy. On the other hand, a precise adjustment can still take place when the connection between the profile parts 1, 7 is produced. To this end, the prestress can be initially adjusted to the desired intensity that can be measured with the measuring elements, for example, by means of clamping before the profile parts are definitively fixed relative to one another, for example, by welding these components together. Alternatively, the prestress can be generated by means of screws on flanges, wherein the measuring elements can also be individually or collectively used as indicators for the prestressing force while the screws are tightened. In this case, a constant value of the prestressing force over the entire length of the hollow profile should be realized by means of precise local adjustments.

In the inventive embodiment, the measuring arrangement 4 is arranged and positioned between contact surfaces of the mountings 3 and 6 that are not individually identified. In this embodiment, the measuring arrangement 4 comprises a piezoelectric sensor, e.g., quartz or other crystals or piezoelectric ceramics or piezoelectric films. This sensor contains piezoelectric crystals that are only sensitive to pressure and/or only sensitive to shearing forces perpendicular to the axis of the hollow profile sensor. In this case, the measuring arrangement has such a modular design that only weight components, only shear force components or weight and shear force components acting upon the road surface can be measured. The function of the measuring elements corresponds to the disclosure of U.S. Pat. No. 5,461,924.

According to the invention, the tube section 1 is provided with a flange 8 that is fixed on the force anchoring flange 5. FIG. 2 shows a screw connection of the flange 8 to the force anchoring flange 5, wherein an additional sealing element 10 is arranged between the two flanges 8, 5. The sealing element 10 seals the interior of the tube section 1 along the flange 8.

Figure 3:
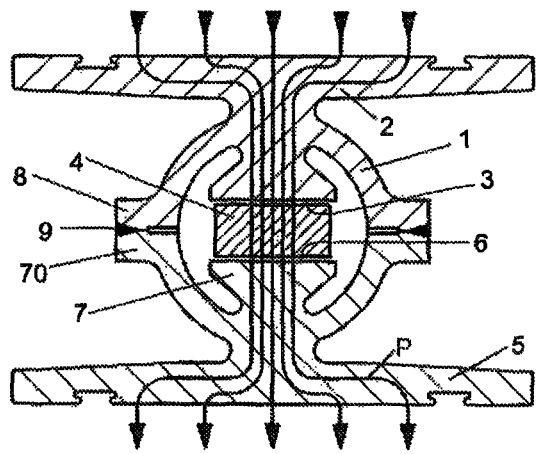
FIG. 3 shows another embodiment of an inventive hollow profile sensor.

In another embodiment that is illustrated in FIG. 3, the tube section 1 is approximately divided into haves in the transverse direction and the flange 8 consequently is fixed on a bearing flange 70 of the counterpart 7 such that it is spaced apart from the force anchoring flange 5 in the transverse direction. The measuring arrangement 4 therefore lies approximately at the same height as the flange 8 of the tube section 1 and the bearing flange 70 of the counterpart 7 and is centrally positioned in the hollow profile.

The flanges 8, 70 and therefore the tube section 1 and the counterpart 7 are inseparably welded to one another as indicated with a welding seam 9.

Figure 4:
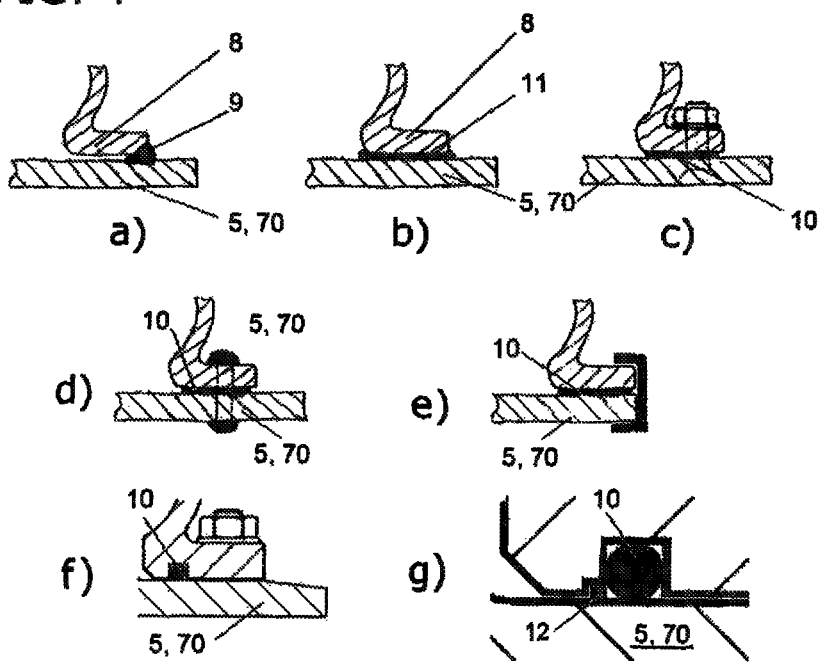
FIG. 4 shows examples for connecting the profile parts.

FIG. 4 shows options for connecting the tube section 1 to the counterpart 7, for example, in the form of connections between the flange 8 and the force anchoring flange 5.

This may be realized, e.g., by means of a welding seam 9 (a), bonding (b), screws (c, f), rivets (d) or clamping (e) while simultaneously generating the required prestressing force on the measuring arrangement 4. In bonded connections, an adhesive layer 11 is formed that not only fulfills the adhesive function, but also seals the profile interior. In non-positive and/or positive connections, at least one sealing element 10 is respectively provided.

The above-described connecting options can also be used for producing a connection between the flange 8 and the bearing flange 70. It is advantageous to provide the tube section 1 with defined surfaces in the form of the flange 8 and defined surfaces in the form of the bearing flange 70 or the force anchoring flange 5 such that a reproducible connection of the multi-part hollow profile sensor is ensured.

In the two embodiments illustrated in FIGS. 2 and 3, the contact surfaces of the mountings 3, 6 can be mechanically processed in a simple and accurate fashion. This ensures that the two mountings 3, 6 have a precise flatness and parallelism relative to one another such that the measuring arrangement 4 can be uniformly prestressed over the length of the hollow profile sensor even if the connection is produced by means of welding, in which case an individual adjustment, for example, by means of screws is not carried out.

The prestressing of the measuring elements is realized by pressing together both profile parts, wherein the tube section 1 extends and a prestressing force is exerted upon the measuring arrangement 4 by the mountings 3, 6. The profile parts are subsequently connected as described above. The measuring arrangement 4 is then operational, fixed and prestressed.

The prestressing force can be increased by adjusting the tension of the profile parts relative to one another. The prestressing force can likewise be locally adjusted over the length of the hollow profile sensor such that it is possible to precisely adjust the prestress at different locations of the profile.

Due to the open construction of the hollow profile sensor, a reliable seal is required over the entire profile length. In welded or bonded connections, this is respectively realized directly during the connecting process by means of a welding seam 9 or an adhesive layer 11 whereas a flat sealing element 10 or a sealing compound may be used in screwed, riveted or clamped connections. Alternatively, a sealing element 10 in the form of a sealing cord 10 may also be placed into a corresponding recess provided for this purpose on one or both sides of the sealing plane as illustrated in FIG. 4*f*).

FIG. 4*g*) shows an enlarged detail of FIG. 40 in the region of the sealing cord 10. The recess with the sealing element 10 is preferably situated in the tube section 1. According to the invention, the counterpart 7 is provided with a stop 12 on the other side of the sealing plane opposite of the recess, wherein said stop engages into the recess and ensures that the tube section 1 and the counterpart 7 are centered relative to one another. The recess and the stop 12 preferably are arranged to both sides of the central axis in the region of the connection such that a fixing function is also realized in addition to the centering function. In this way, possible transverse forces between the tube section 1 and the counterpart 7 are intercepted at the connecting plane. The arrangements of the recess and the stop 12 on the tube section 1 and on the counterpart 7 may also be interchanged.

On the face, the hollow profile sensor is conventionally sealed, e.g., by means of a not-shown plug. Analogous to the disclosure of U.S. Pat. No. 5,461,924, the hollow profile sensor may be manufactured in the form of a sensor ready to be installed.

The measuring arrangement 4 in the embodiments of the hollow profile sensor may be also realized in accordance with the resistive, piezoresistive or capacitive measuring principle and comprise one corresponding sensor or a plurality of corresponding sensors.

In the inventive hollow profile sensor, in particular, the wall thickness of the tube section 1 is in the prestressed region realized smaller than the material thickness of the flanges 8, 70, 5 of the tube section 1 and of the counterpart 7. This creates local reinforcements in the connecting regions 8, 70 which in turn ensure that these regions are not extended in the prestressing direction, i.e. in the direction of the flow of forces P, when the prestress of the profile parts is generated. This is particularly important if the connection is produced by means of welding because a weld frequently does not have a predefined constant welding depth. A welded connection, in which the welding depth is a variable for the prestress, is unusable for this device. Regardless of the connecting technique, the required accuracy can be ensured much better with a reinforcement of the flanges 8, 70, 5 in any case. The prestress must be reproducible and cannot be dependent on the quality of the attachment.

Analogous to the arrangement known from the prior art, the measuring arrangement 4 in this case preferably also consists of a plurality of sensors in series. According to the invention, the connections between the profile parts 1, 7 in this case consist of a plurality of connecting points that are arranged equidistantly from discrete sensor elements of the measuring arrangement 4. This ensures that all sensor elements are subjected to symmetric prestressing conditions.

LIST OF REFERENCE SYMBOLS

1 Tube section
2 Force introduction flange
3 Mounting
4 Measuring arrangement
5 Force anchoring flange
6 Mounting
7 Counterpart
70 Bearing flange
8 Flange
9 Welding seam
10 Sealing element, sealing cord
11 Adhesive layer
12 Stop
P Line of force

The invention claimed is:

1. A hollow profile sensor for the installation into roads or a road surface for the purpose of measuring the weight of vehicles and/or dynamic reactions of vehicles or of vehicle wheels to the road, as well as for measuring vehicle speeds and other quantities to be measured, comprising:
   an axially elongated tube section
   an axially elongated counterpart that is not unitary with the axially elongated tube section,
   the axially elongated tube sectioning having an exterior and a hollow interior, the tube section defining a connecting flange for connecting the tube section to the counterpart, the tube section further defining in the hollow interior a first mounting configured for contacting an axially elongated measuring arrangement disposed in the hollow interior, the first mounting having a length measuring between one meter and 4 meters,
   a force introduction flange that is connected to the exterior of the tube section,
   the counterpart connected to the connecting flange of the tube section and defining a force anchoring flange and a second mounting, wherein the second mounting is disposed in opposition to the first mounting along the entire length thereof and configured for contacting the measuring arrangement, and
   a measuring arrangement disposed between and contacting the first and second mountings and configured with respect to the mountings in such a way that a concentration of force application lines on the measuring arrangement is realized.

2. The hollow profile sensor according to claim 1, wherein the tube section defines an elongated open slot.

3. The hollow profile sensor according to claim 1, wherein the tube section is connected to the counterpart by one of a force-locked connection and a form-locked joint.

4. The hollow profile sensor according to claim 3, wherein at least one sealing element is arranged between the tube section and the counterpart.

5. The hollow profile sensor according to claim 3, further comprising a sealing compound disposed between the tube section and the counterpart for sealing the interior of the tube section.

6. The hollow profile sensor according to claim wherein the tube section is integrally bonded to the counterpart.

7. The hollow profile sensor according to claim 1, wherein the counterpart defines a bearing flange, and the tube section is fixed on one of the force anchoring flange or the bearing flange of the counterpart with its connecting flange.

8. The hollow profile sensor according to claim 1, wherein the measuring arrangement comprises a sensor element chosen from the following list: a piezoelectric, a piezoresistive, a capacitive and a resistive sensor.

9. The hollow profile sensor according to claim 1, wherein the tube section and the counterpart are connected by tensioning them relative to one another in such a way that a prestressing force on the measuring element is generated by means of the mountings.

10. The hollow profile sensor according to claim 9, wherein the prestress on the measuring arrangement is realized by extending the tube section.

11. The hollow profile sensor according to claim 9, wherein the tensioning of the tube section and the counterpart relative to one another can be adjusted over the length of the hollow profile sensor.

12. The hollow profile sensor according to claim 11, wherein the prestress on the measuring arrangement is evened out by adjusting the tensioning of the profile parts relative to one another.

13. The hollow profile sensor according to claim 1, wherein the tube section defines walls in a prestressed region and the wall thickness of the tube section in the prestressed region is smaller than the material thickness of the force introduction flange of the tube section and of the force anchoring flange of the counterpart.

14. The hollow profile sensor according to claim 1, wherein the measuring arrangement consists of a plurality of sensors in series.

15. The hollow profile sensor according to claim 5, wherein the measuring arrangement includes discrete sensor elements and the connection between the tube section and the counterpart includes a plurality of connecting points that are arranged equidistantly from discrete sensor elements of the measuring arrangement.

16. The hollow profile sensor according to claim 1, wherein the two mountings have a precise flatness and parallelism to one another.

17. The hollow profile sensor according to claim 1, further comprising shear sensors in the measuring arrangement.

18. The hollow profile sensor according to claim 4, wherein the tube section includes a recess and the sealing element in the form of a sealing cord is arranged in the recess.

19. The hollow profile sensor according to claim 1, wherein a recess is arranged on the tube section and a stop is arranged in the counterpart opposite of this recess, wherein said stop engages into the recess and ensures that the tube section and the counterpart are centered relative to one another.

20. The hollow profile sensor according to claim 19, wherein the aforementioned recess and stop are arranged to both sides of a central axis in the hollow profile sensor in the region of the connection between the tube section and the counterpart in order to also ensure a fixing function between the tube section and the counterpart in addition to the centering function.

* * * * *